(12) United States Patent
Koenig (10) Patent No.: US 11,000,433 B2
(45) Date of Patent: May 11, 2021

(54) CHASSIS FOR A MOBILITY AID AND FOR AN ELECTRIC WHEELCHAIR

(71) Applicant: OTTO BOCK MOBILITY SOLUTIONS GMBH, Konigsee-Rottenbach (DE)

(72) Inventor: Johannes Koenig, Gotha (DE)

(73) Assignee: OTTO BOCK MOBILITY SOLUTIONS GMBH, Konigsee-Rottenbach (DE)

( * ) Notice: Subject to any disclaimer, the term of this patent is extended or adjusted under 35 U.S.C. 154(b) by 0 days.

(21) Appl. No.: 16/335,668

(22) PCT Filed: Sep. 7, 2017

(86) PCT No.: PCT/EP2017/072487
§ 371 (c)(1),
(2) Date: Mar. 21, 2019

(87) PCT Pub. No.: WO2018/054693
PCT Pub. Date: Mar. 29, 2018

(65) Prior Publication Data
US 2019/0307620 A1    Oct. 10, 2019

(30) Foreign Application Priority Data
Sep. 23, 2016    (DE) .......................... 102016118018.1

(51) Int. Cl.
*A61G 5/10*    (2006.01)
*A61G 5/04*    (2013.01)
(Continued)

(52) U.S. Cl.
CPC ............... *A61G 5/10* (2013.01); *A61G 5/042* (2013.01); *A61G 5/043* (2013.01); *A61G 5/045* (2013.01);
(Continued)

(58) Field of Classification Search
CPC ........ A61G 5/042; A61G 5/043; A61G 5/045; A61G 5/041; A61G 5/047
See application file for complete search history.

(56) References Cited

U.S. PATENT DOCUMENTS 5,575,348 A * 11/1996 Goertzen ............... A61G 5/045
180/65.6
5,944,131 A * 8/1999 Schaffner ............... A61G 5/043
180/65.1
(Continued)

FOREIGN PATENT DOCUMENTS

| CN | 2930810 Y | 8/2007 |
| CN | 2931010 Y | 8/2007 |

(Continued)

OTHER PUBLICATIONS

PCT International Search Report for PCT International Patent Application No. PCT/EP2017/072487, dated Nov. 29, 2017.

*Primary Examiner* — Brian L Swenson
(74) *Attorney, Agent, or Firm* — Holland & Hart LLP (57) ABSTRACT

A chassis for a mobility aid, the mobility aid including at least one base two lateral walls, and at least one connecting element which connects the two lateral walls. The chassis includes a plurality of positioning aids for each lateral wall, a bracket that can be connected to one lateral wall in at least three different configurations, and a drive unit that is connected to each bracket, wherein a bracket configuration on the lateral walls determines the type of drive for the mobility aid.

27 Claims, 9 Drawing Sheets

(51) Int. Cl.
 *B60K 1/00* (2006.01)
 *B60K 1/04* (2019.01)
(52) U.S. Cl.
 CPC .............. *A61G 5/047* (2013.01); *B60K 1/00* (2013.01); *B60K 1/04* (2013.01); B60K 2001/0422 (2013.01)

(56) References Cited

U.S. PATENT DOCUMENTS

| | | | |
|---|---|---|---|
| 6,179,076 B1 * | 1/2001 | Fernie | A61G 5/043 180/65.1 |
| 6,684,969 B1 * | 2/2004 | Flowers | A61G 5/042 180/316 |
| 2004/0004342 A1 * | 1/2004 | Mulhern | G06F 9/383 280/304.1 |
| 2019/0307620 A1 * | 10/2019 | Konig | A61G 5/043 |

FOREIGN PATENT DOCUMENTS

| | | |
|---|---|---|
| DE | 102009051118 A1 | 4/2011 |
| EP | 0776647 A1 | 6/1997 |
| EP | 1279392 A2 | 1/2003 |
| EP | 1522293 A2 | 4/2005 |
| EP | 2143407 A1 | 1/2010 |
| WO | 0025718 A2 | 5/2000 |

* cited by examiner

CHASSIS FOR A MOBILITY AID AND FOR AN ELECTRIC WHEELCHAIR

TECHNICAL FIELD

The invention relates to a chassis for a mobility aid, consisting of at least two side walls and at least one connecting element connecting the two side walls. In particular, the invention relates to a chassis for an electric wheelchair, which chassis comprises at least two side walls and two end walls.

BACKGROUND

Mobility aids in the sense of the present invention are orthopedic devices for persons with limited mobility. Mobility aids can be, for example, wheelchairs, walking aids or walker frames or other devices and instruments which increase mobility. Such devices and in particular wheelchairs have long been disclosed in the prior art.

Such a chassis is disclosed, for example, in DE 10 2009 051 118 B4. There are electric wheelchairs with three types of drive, namely front-wheel drive, rear-wheel drive and central drive. Selecting the type of drive of an electric wheelchair is important. Maneuverability, tracking stability and handling outdoors are influenced by the type of drive. The suitable type of drive is selected in dependence on the application, location and use of the electric wheelchair.

Wheelchairs equipped with front-wheel drive have compact dimensions and have their center of gravity between the drive axle and the steering wheel. The center of rotation of the wheelchair is situated in front of the center of rotation of the user, which requires attention to be paid to the rear swinging out when the wheelchair is turned.

The turning circle is small because the wheelchair is also able to be turned in the arc as a result of the position of the center of rotation. Traveling downhill is supported as result of the higher traction on the drive axle.

The classic type of drive is also rear-wheel drive in the case of electric wheelchairs. Said wheelchairs have very good handling characteristics, even at high speeds. The center of rotation of the wheelchair is situated behind the center of rotation of the user in the case of rear-wheel drive, which results in the electric wheelchair having a large turning circle. The wheelchair also turns within the arc in the case of rear-wheel drive. Traveling uphill is supported with rear-wheel drive because the traction on the rear axle is increased as a result of the center of gravity being shifted.

Electric wheelchairs with central drive have six individually suspended wheels, all six wheels being in permanent contact with the ground. Said characteristic always keeps the wheelchair in a quiet and stable position, which is transmitted to the user and prevents the generation of spasms. The center of rotation of the wheelchair coincides with the center of rotation of the user. A high level of stability is achieved by the center of gravity lying above the drive axle, which allows for intuitive driving and consequently benefits the user with a higher degree of disability. The center of gravity only changes minimally when traveling uphill and downhill, which results in consistent propulsion. Steep tracks and ramps are able to be navigated without any problem even sideways.

The different types of drive require different chassis embodiments in order to connect the drive wheels and the motors to the chassis. As a result, production costs and the costs for storage are increased, in addition product diversity is restricted.

SUMMARY

Proceeding from here, the object underlying the invention is to improve the generic chassis for a mobility aid and additionally also to develop the generic chassis of an electric wheelchair further such that it is able to be used for at least two of the three types of drive.

The object is achieved in general for a mobility aid by a chassis with the following features:
 a) each side wall comprises multiple positioning aids,
 b) a bracket which is connectable to each respective side wall in at least two different arrangements,
 c) a drive unit which is connected to the bracket.

The object is achieved for an electric wheelchair by a chassis with the following features:
 a) each side wall comprises a hole pattern which consists of a plurality of bores,
 b) a bracket provided with a stub shaft is connectable to each respective side wall in at least three different arrangements,
 c) the arrangement of the brackets on the side walls determines the type of drive of the wheelchair.

A chassis for at least two of the three types of drive is possible as a result of said embodiment. The two brackets which are attachable to the side walls are realized identically, the hole pattern on the side walls is also identical (in a mirror-inverted manner). The production costs and storage are clearly reduced as a result and changing the production over to a different type of drive is made much easier.

It is advantageous when in addition to the side walls and the end walls, the chassis also comprises at least one base.

When each bracket is connectable to one side wall each in at least three different arrangements, it is ensured that the chassis is usable for all three types of drive.

A stub shaft, which serves for receiving the drive unit, is preferably fastened to the bracket. Particularly preferably, the stub shaft is arranged horizontally from the chassis, that is to say extending parallel to the ground (road).

As a result of a symmetrical arrangement of the brackets on the chassis, one structured bracket is able to be used for both side walls, as a result of which the variety of components is reduced.

The positioning aids are preferably holes or bores for fastening screws or rivets, for elevations or indentations or rails.

Each bracket is preferably connected to the side wall by means of screw-connecting or riveting or bonding or welding.

For an electric wheelchair, the axle stub is realized preferably for receiving a drive unit consisting of at least one wheel and one electric motor driving the wheel. When the drive unit is pivotably mountable on the bracket by means of a spring-damper unit, it can be fastened to the chassis as a pre-assembled unit and fulfills its function without further assembly. The wheel can preferably be fitted onto the drive unit once said drive unit has been fastened to the bracket/chassis. This simplifies the assembly.

The bracket is preferably realized in an L-shaped manner with a short and a long leg. It consists particularly preferably of a flat steel.

It is advantageous when the stub shaft is arranged on the short leg and it is particularly advantageous when a journal is arranged on the long leg for fastening a spring/damper unit. If the brackets are fastened at the front of the side walls with reference to the direction of travel, the chassis is used for a wheelchair with front-wheel drive. When the brackets are fastened at the back of the side wall with reference to the direction of travel, the chassis is prepared for rear-wheel drive. Central drive can be realized by fastening in the central position. Where applicable, it is necessary to swap the brackets in this case, that is to say to fasten the bracket provided for the right-hand side wall (when viewed in the direction of travel) on the left-hand side wall and vice versa.

Each bracket is preferably fastenable to the side wall at least at three points. These are preferably the short leg, the long leg and the corner region in which the two legs meet one another. It is advantageous for this purpose when the hole pattern of one side wall includes at least nine bores. In a preferred manner, the two legs are screw-connected to the side walls in each case at three points.

In a preferred manner, the chassis is realized in a box-shaped manner and, consequently, can receive a battery pack for supplying power to the two electric motors in an advantageous manner between the end walls and the side walls.

BRIEF DESCRIPTION OF THE DRAWINGS

Exemplary embodiments of the invention on the basis of an electric wheelchair are explained in more detail below by means of a drawing, in which.

DETAILED DESCRIPTION

As already mentioned, mobility aids in the sense of the invention are generally speaking orthopedic devices for persons with limited mobility. They can be, for example, wheelchairs, walking aids or walker frames, buggies or other devices and instruments which increase mobility. In particular, an electric wheelchair, as already stated in the introduction, is offered in three different drive variations and is consequently particularly appropriate for the application of the invention so that said invention will be described below by way of an electric wheelchair (1).

The electric wheelchair (1) consists substantially of a chassis (10), a seat frame 5 with backrest 4 mounted on the chassis 10 for receiving a seat as well as drive wheels 2 and steering wheels 3.

The chassis 10 is realized in a box-shaped manner and is formed by a base 11, oppositely situated end walls 12, 14 and oppositely situated side walls 13, 15. The walls 12, 13, 14, 15 and the base 11 can be welded together at the adjoining side edges. An L-shaped bracket 16 with a short leg 16' and a long leg 16" is screw-connected to each side wall 13, 15. The bracket 16 can be screwed on in three different arrangements. The arrangement of the bracket 16 determines the type of drive.

Figure 1:
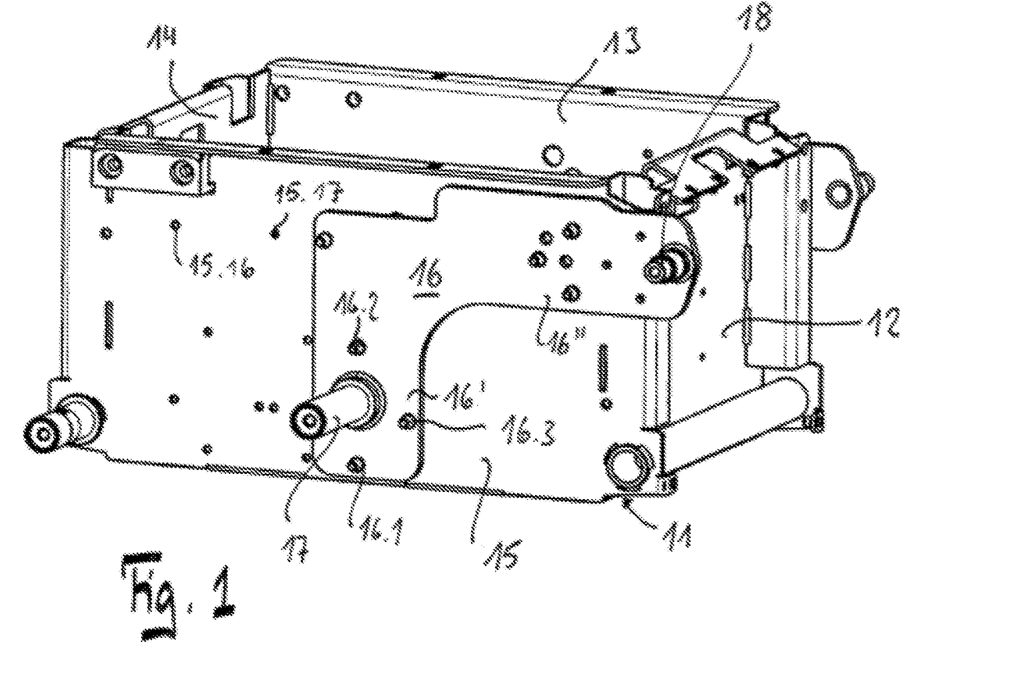
FIG. 1—shows a perspective representation of the chassis for front-wheel drive.
Figure 2:
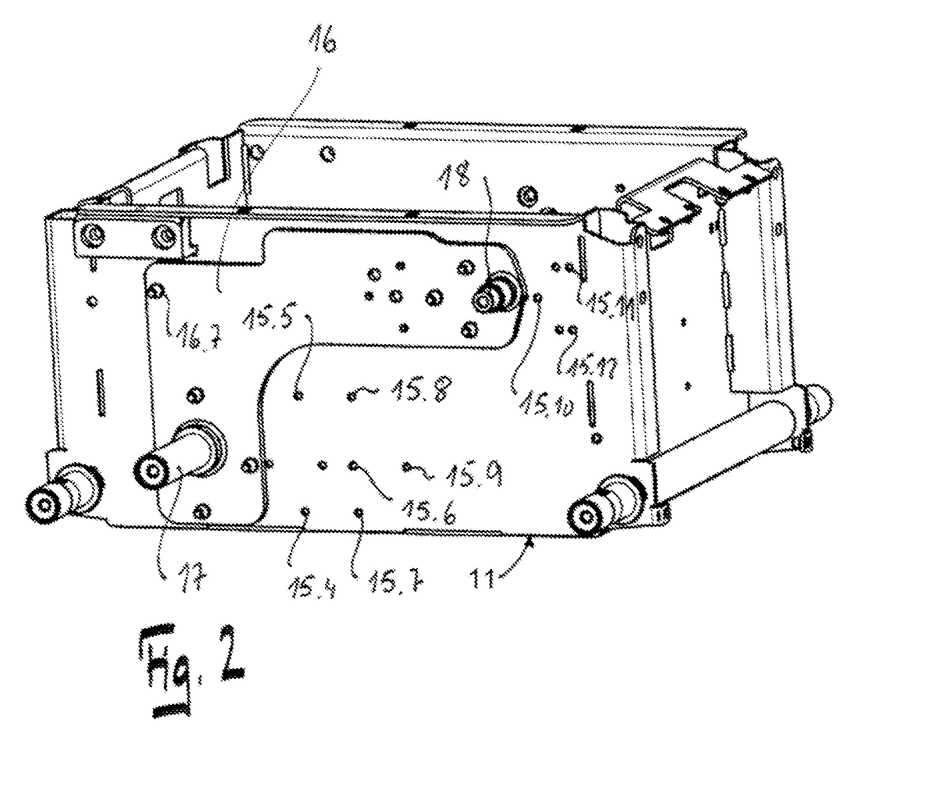
FIG. 2—shows a perspective representation of the chassis for central drive.
Figure 3:
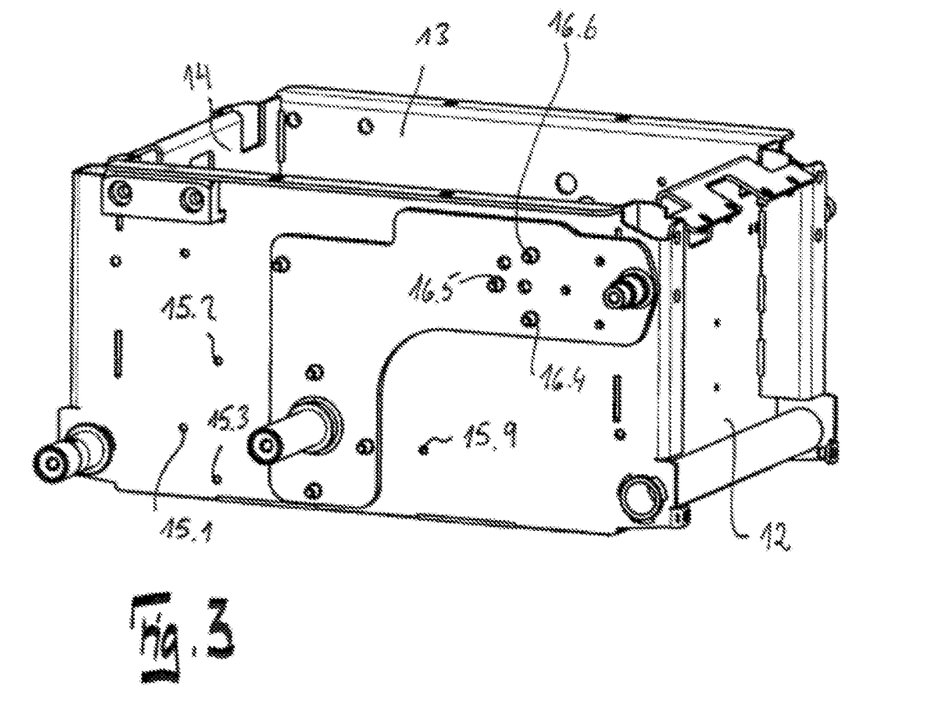
FIG. 3—shows a perspective representation of the chassis for rear-wheel drive.
Figure 4:
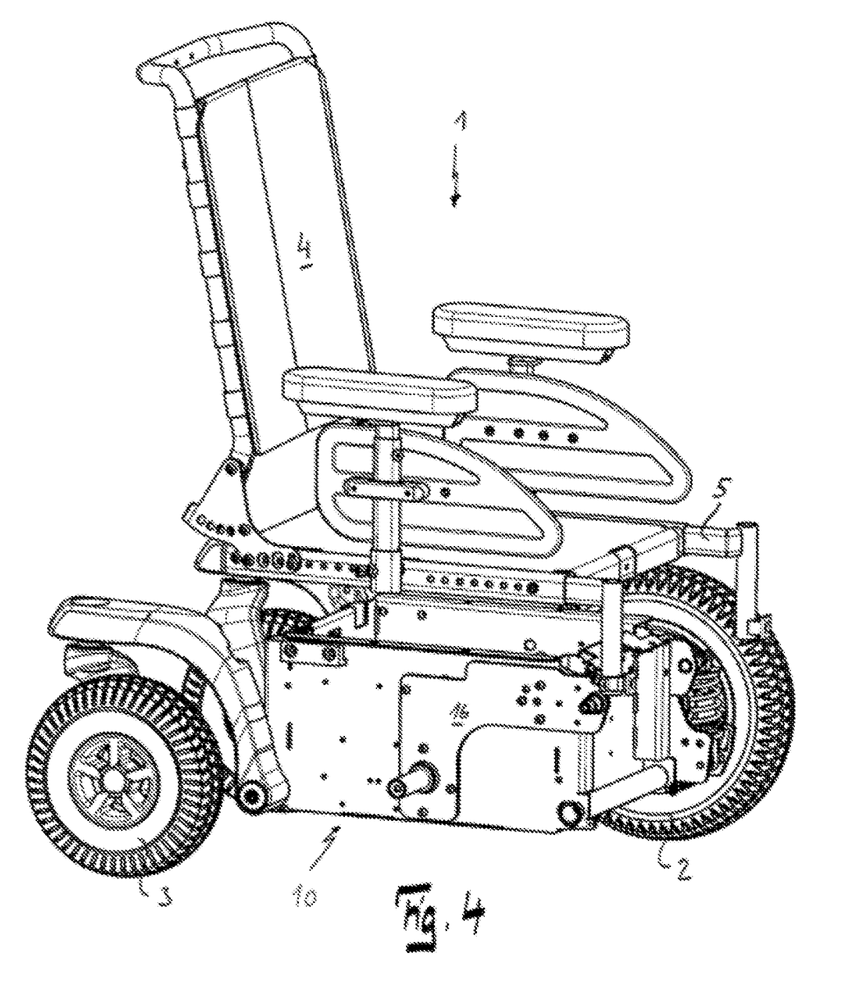
FIG. 4—shows a perspective representation of a front-wheel drive wheelchair.
Figure 5:
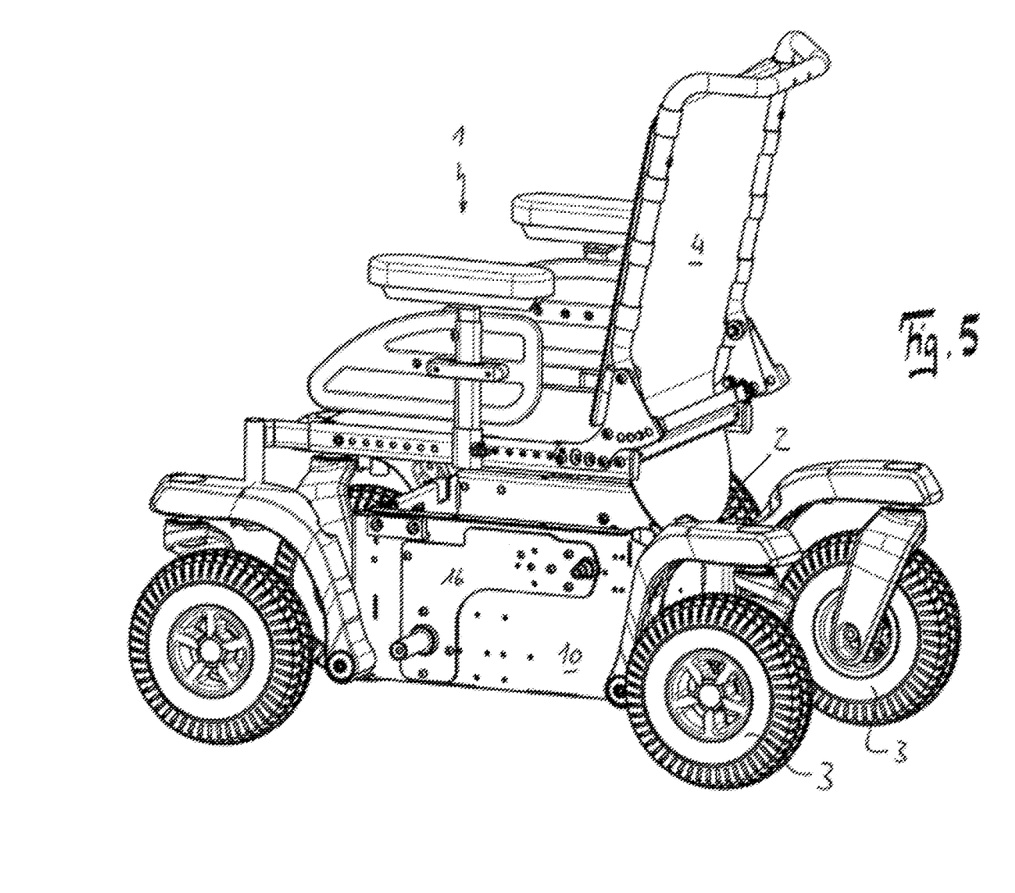
FIG. 5—shows a perspective representation of a central drive wheelchair.
Figure 6:
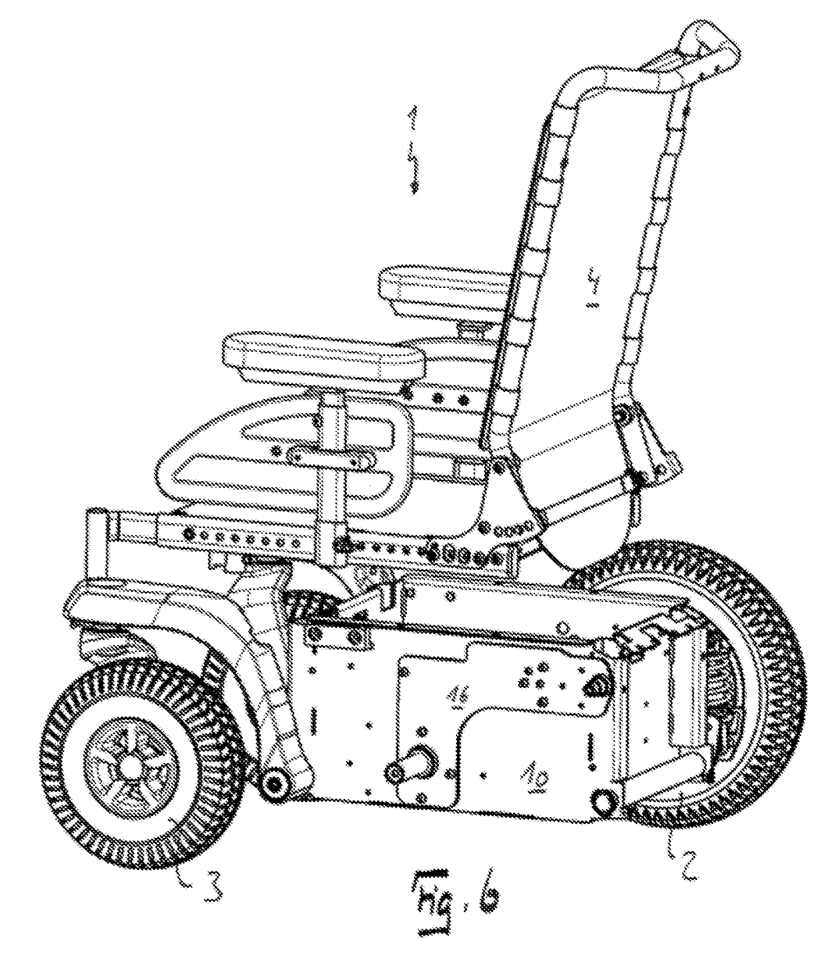
FIG. 6—shows a perspective representation of a rear-wheel drive wheelchair.

In order to be able to realize the different arrangements, each side wall 13, 15 comprises a hole pattern which includes a plurality of bores 15.1, 15.2, 15.3; 15.4, 15.5, 15.6; 15.7, 15.8, 15.9; 15.10, 15.11, 15.12. The hole pattern can be seen in FIGS. 2 and 3, the bores 15.10, 15.11, 15.12 being present in triplicate as a set. Two sets are hidden by the long leg 16" of the bracket 16 in the figures. The short leg 16' is provided with bores 16.1, 16.2, 16.3 which match the hole pattern with the bores 15.1, 15.2, 15.3; 15.4, 15.5, 15.6 and 15.7, 15.8, 15.9. The long leg 16" is provided with bores 16.4, 16.5, 16.6, the arrangement of which matches the bores 15.10, 15.11, 15.12 of the hole pattern. A further connecting point is provided outside in the region where the short leg 16' and the long leg 16" meet. More bores 15.16, 15.17, the arrangement of which in the hole pattern matches the bore 16.7 in the respective arrangement of the bracket 16 on the side wall 13, 15, are also provided here correspondingly in the side walls 13, 15.

The bracket 16 comprises a stub shaft 17 or axle bolt on its short leg 16' and a journal 18 on its long leg 16".

Figure 7:
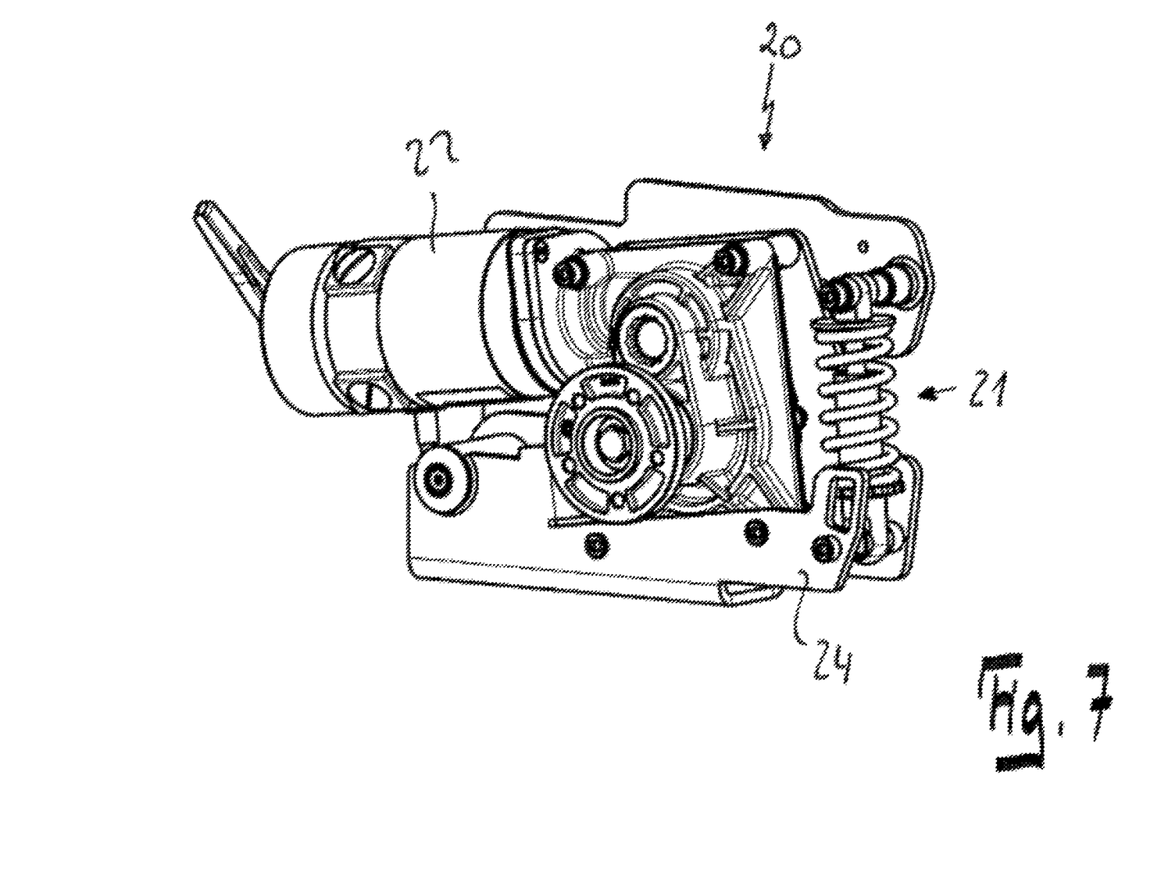
FIG. 7—shows a perspective representation of a drive unit.
Figure 8:
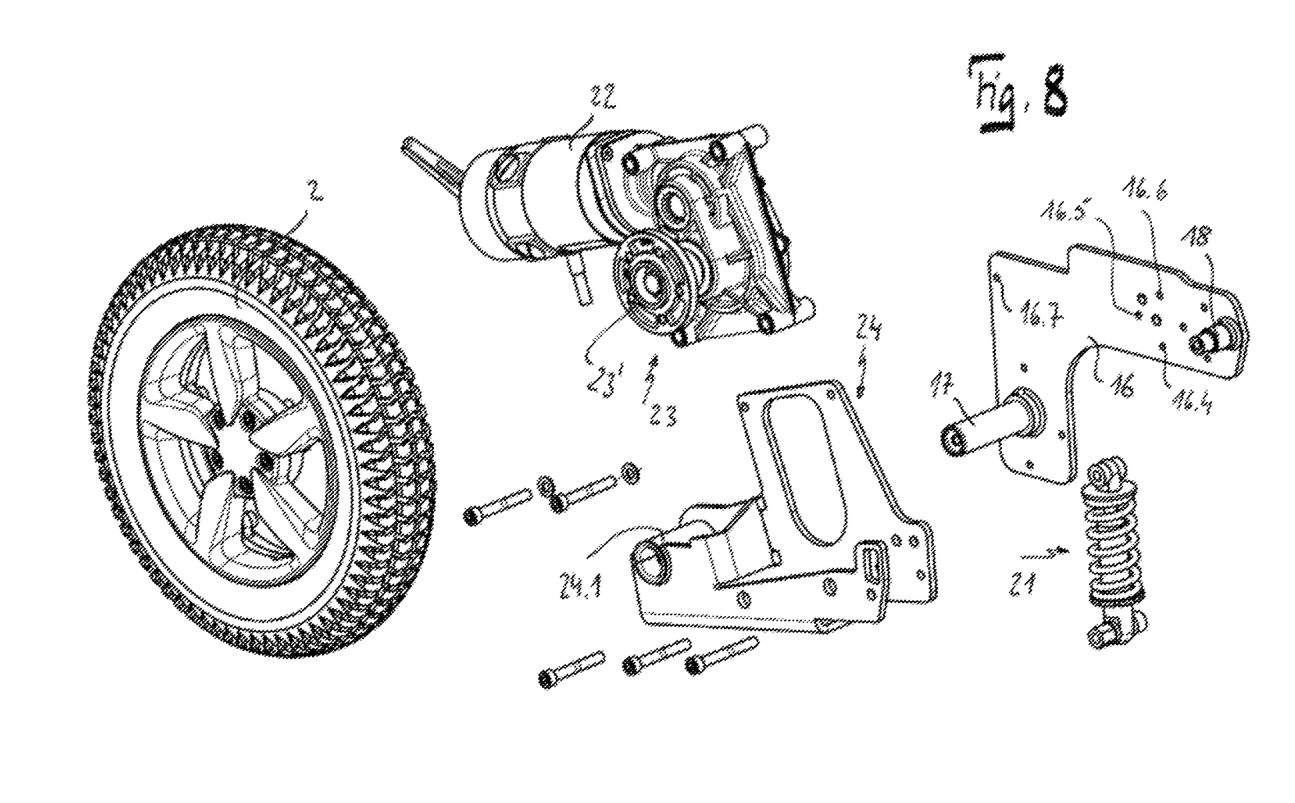
FIG. 8—shows an exploded representation of the drive unit according to FIG. 7 with a drive wheel.
Figure 9:
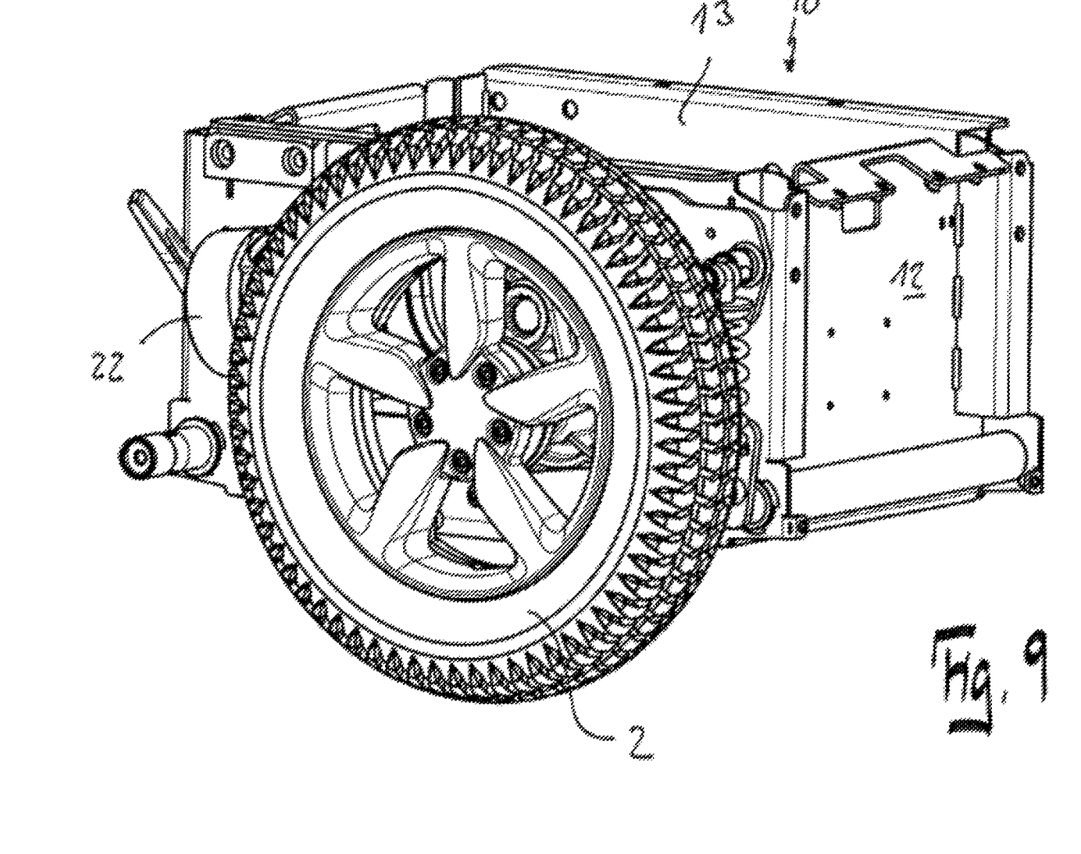
FIG. 9—shows a perspective representation of the chassis with the drive unit attached.

The stub shaft 17 serves for receiving a drive unit 20 which is pivotably mounted on the journal 18 by means of a spring-damper unit 21. The drive unit 20 includes a drive wheel 2, a drive motor 22 and a gearing unit 23 with a flange 23' for receiving the drive wheel 2 as well a receiving frame 24 which is provided with a connector 14.1. Drive motor 22 and gearing unit 23 are screw-connected to the receiving frame 24. The spring-damper unit 21 is connected at its lower end to the receiving frame 24, the receiving frame 24 with its connector 24.1 is then fitted onto the stub shaft 17 and the spring-damper unit 21 is connected by way of its upper end to the journal 18. The wheel 2 is finally fitted onto the flange 23' so that the drive is fixed.

As a result of the box-shaped embodiment of the chassis 10, it is possible to receive a battery pack (not shown here) for supplying energy to the electric motors 22 between the side walls 13, 15 and the end walls 12, 14, said battery pack is supported on the base 11 and is secured to said base to prevent it slipping.

The invention claimed is:

1. A chassis for a mobility aid, comprising:
   at least two side walls, each side wall comprising multiple positioning aids;
   at least one connecting element connecting the two side walls;
   a bracket which is connectable to each side wall in at least two different arrangements;
   a drive unit which is connected to the bracket;
   wherein the arrangement of the bracket on the side wall determines a type of drive of the mobility aid, the type of drive including at least two of three types of drives, including front-wheel drive, rear-wheel drive, and central drive.

2. The chassis as claimed in claim 1, further comprising a stub shaft fastened to the bracket to receive the drive unit.

3. The chassis as claimed in claim 2, wherein the stub shaft is arranged horizontally from the chassis.

4. The chassis as claimed in claim 2, wherein the stub shaft is arranged horizontally from the chassis.

5. The chassis as claimed in claim 1, wherein the brackets are arranged symmetrically on the chassis.

6. The chassis as claimed in claim 1, wherein the positioning aids comprise holes for fastening screws or rivets, or elevations or indentations or rails.

7. The chassis as claimed in claim 1, wherein the bracket is connected to at least one of the side walls by screw-connecting or riveting or bonding or welding.

8. The chassis as claimed in claim 1, wherein the chassis comprises at least one base.

9. The chassis as claimed in claim 1, wherein the bracket is connectable to at least one of the side walls in at least three different arrangements.

10. A chassis for an electric wheelchair, comprising:
    at least two side walls, each side wall comprising a hole pattern provided by a plurality of bores;
    two end walls;
    a bracket provided with a stub shaft, the bracket being connectable to each respective side wall in at least two different arrangements;
    wherein the arrangement of the bracket on at least one of the side walls determines a type of drive of the wheelchair, the type of drive including at least two of three types of drives, including front-wheel drive, rear-wheel drive, and central drive.

11. The chassis as claimed in claim 10, further comprising at least one base.

12. The chassis as claimed in claim 10, wherein the bracket is connectable to the at least one side wall in at least three different arrangements.

13. The chassis as claimed in claim 10, further comprising a drive unit, the stub shaft receives the drive unit, and the drive unit has at least one drive wheel and one electric motor driving the drive wheel.

14. The chassis as claimed in claim 13, wherein the drive unit is pivotably mountable on the bracket with a spring-damper unit.

15. The chassis as claimed in claim 13, wherein the bracket is fastenable to the at least one side wall at least at three points.

16. The chassis as claimed in claim 15, wherein the hole pattern of one side wall includes at least nine bores.

17. The chassis as claimed in claim 13, further comprising a battery pack to supply power to the electric motors, the batter pack being received between the end walls and the side walls.

18. The chassis as claimed in claim 10, wherein the bracket has an L-shaped structure with a short leg and a long leg.

19. The chassis as claimed in claim 18, wherein the stub shaft is arranged on the short leg.

20. The chassis as claimed in claim 19, wherein the stub shaft and the journal are arranged in a region of the free ends of the legs.

21. The chassis as claimed in claim 18, further comprising a journal for fastening the spring-damper unit, the journal being arranged on the long leg.

22. A chassis for a mobility aid, comprising:
    at least two side walls, each side wall comprising multiple positioning aids;
    at least one connecting element connecting the two side walls;
    a bracket which is connectable to each side wall in at least two different arrangements;
    a drive unit which is connected to the bracket;
    a stub shaft fastened to the bracket to receive the drive unit;
    wherein the arrangement of the bracket on the side wall determines a type of drive of the mobility aid.

23. A chassis for an electric wheelchair, comprising:
    at least two side walls, each side wall comprising a hole pattern provided by a plurality of bores;
    two end walls;
    a bracket provided with a stub shaft, the bracket being connectable to each respective side wall in at least two different arrangements;
    a drive unit, the stub shaft receives the drive unit, and the drive unit has at least one drive wheel and one electric motor driving the drive wheel;
    wherein the arrangement of the bracket on at least one of the side walls determines a type of drive of the wheelchair.

24. The chassis as claimed in claim 23, wherein the drive unit is pivotably mountable on the bracket with a spring-damper unit.

25. A chassis for an electric wheelchair, comprising:
    at least two side walls, each side wall comprising a hole pattern provided by a plurality of bores;
    two end walls;
    a bracket provided with a stub shaft, the bracket being connectable to each respective side wall in at least two different arrangements, the bracket having an L-shaped structure with a short leg and a long leg, the stub shaft arranged on the short leg;
    wherein the arrangement of the bracket on at least one of the side walls determines a type of drive of the wheelchair.

26. A chassis for an electric wheelchair, comprising:
    at least two side walls, each side wall comprising a hole pattern provided by a plurality of bores;
    two end walls;
    a bracket provided with a stub shaft, the bracket being connectable to each respective side wall in at least two different arrangements, the bracket having an L-shaped structure with a short leg and a long leg;
    a journal for fastening the spring-damper unit, the journal being arranged on the long leg;
    wherein the arrangement of the bracket on at least one of the side walls determines a type of drive of the wheelchair.

27. The chassis as claimed in claim 26, wherein the stub shaft and the journal are arranged in a region of the free ends of the legs.

* * * * *